United States Patent [19]
Dickhart, III

[11] Patent Number: 4,526,109
[45] Date of Patent: Jul. 2, 1985

[54] LATERALLY DAMPED RAILWAY CAR

[75] Inventor: William W. Dickhart, III, Fort Washington, Pa.

[73] Assignee: The Budd Company, Troy, Mich.

[21] Appl. No.: 529,443

[22] Filed: Sep. 6, 1983

[51] Int. Cl.³ .......................... B61F 3/08; B61F 5/10; B61F 5/24
[52] U.S. Cl. ........................... 105/199 R; 105/182 R; 105/197 D
[58] Field of Search ............... 105/164, 175 A, 182 R, 105/192, 193, 197 D, 199 R, 201; 213/223

[56] References Cited

U.S. PATENT DOCUMENTS

| | | | |
|---|---|---|---|
| 2,040,262 | 5/1936 | Kruckenberg et al. | 105/201 X |
| 2,241,757 | 5/1941 | Baade | 105/192 |
| 3,397,652 | 8/1968 | Cardwell | 105/193 |
| 3,568,856 | 3/1971 | Knipple | 213/223 |
| 3,628,465 | 12/1971 | Dobson et al. | 105/164 X |
| 4,228,741 | 10/1980 | Bruner | 105/199 R X |

FOREIGN PATENT DOCUMENTS 1249679 11/1960 France .................. 213/223

Primary Examiner—Robert B. Reeves
Assistant Examiner—Howard Beltran
Attorney, Agent, or Firm—Edward M. Farrell; Herman Foster; Thomas I. Davenport

[57] ABSTRACT

A laterally disposed cylinder including fluid therein connected between a truck and car body is responsive to lateral forces to provide low damping when relatively low lateral forces are applied and proportionally higher damping as relatively higher lateral forces are applied. The cylinder includes a piston to provide two fluid chambers. The piston includes an opening therein. An element is provided to vary the opening in accordance with the lateral forces.

3 Claims, 8 Drawing Figures

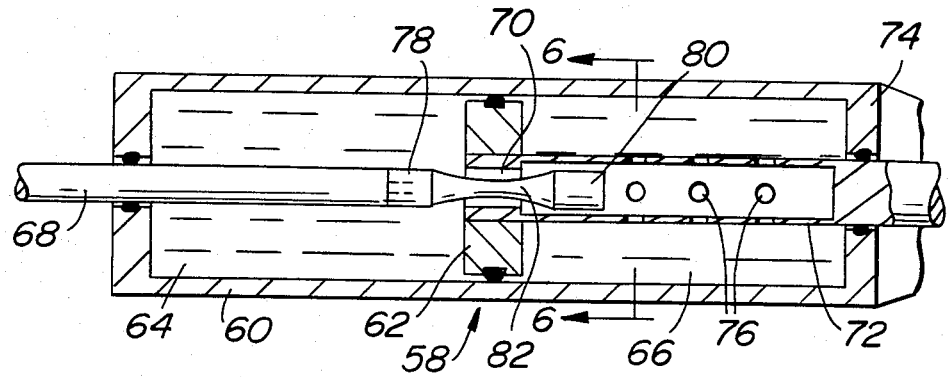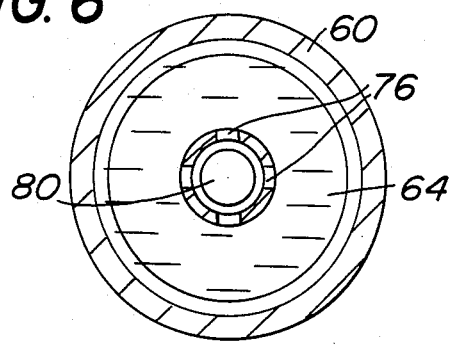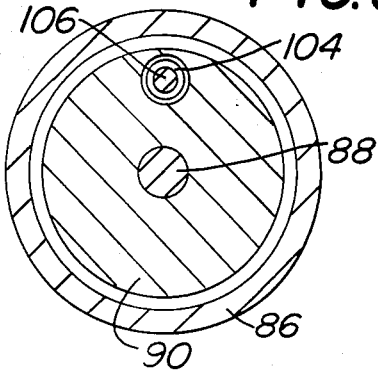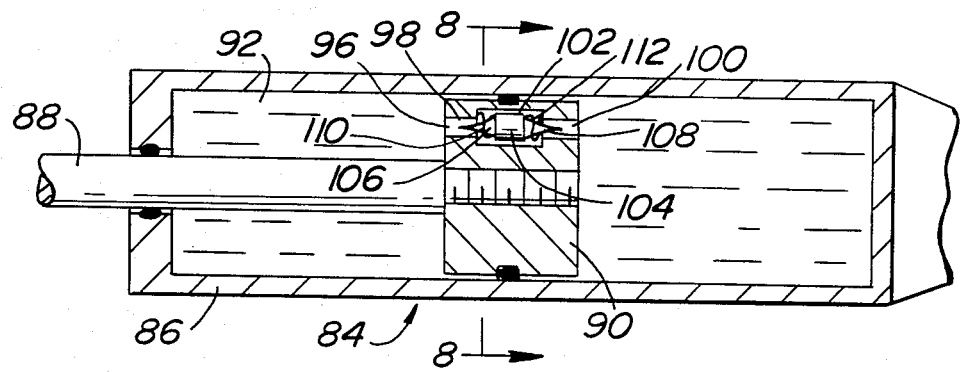

LATERALLY DAMPED RAILWAY CAR

BACKGROUND OF THE INVENTION

Lateral damping apparatus between a truck and a railway car body have been used in the past. Some patents disclosing such apparatus include those issued to Cardwell U.S. Pat. No. 3,397,652; Baade U.S. Pat. No. 2,241,757 and Dobson U.S. Pat. No. 3,628,465. In general, lateral damping apparatus used heretofore have provided damping proportional to the lateral forces applied thereto.

U.S. Pat. No. 3,397,652 is directed to a railway truck bolster dampener. There is provided the laterally extending cylinder 41. The rod 33 having a collar 37 fits in an opening 39 in one end of the cylinder 41. The center of the bell crank 17 is pivotally mounted by the pin 22 between the lugs 23 which extend upwardly from the rack 25. The rack 25 is rigidly secured between the lower portion of the side frames 5 and 7 below the bolster.

U.S. Pat. No. 2,241,757 is directed to a vehicle system. FIG. 19 shows the use of a dampener member 169 to provide an additional lateral motion restrictive mechanism. The mechanism 169 is clearly seen in FIGS. 18 and 23 and in FIG. 19 and 20, it appears that such is merely directed to a spring-like device.

U.S. Pat. No. 3,628,465 is directed to stabilizing high speed railway trucks. The dampening mechanism 50 which is a double-acting hydraulic unit. The unit 50 includes a cylinder member 51 which is pivotally connected at the pivot point 52 to the lower bolster member 22 and further includes a piston member 53 pivotally connected at the pivot point 54 to the upper bolster member 23. This does provide for the laterally extending dampening units as provided in the present invention.

U.S. Pat. No. 1,973,816 is directed to vehicle roller mountings and although directing itself to other inventive elements, it does provide for the pre-loaded springs 27 shown in FIG. 2 which may be thought of as laterally extending dampening units, although not in the same type of mechanism structure as provided in the present invention.

In recent years, passenger rail car suspensions have been designed to optimize the ride comfort for continuous input forces, such as those generated by rail joints every 39 feet. Computer simulations have been used to establish the degree of critical damping necessary for the best ride with an appropriate spring system. With the expanded use of continuously welded rails with joints every 1,000 feet or more, the nature of the track initiated disturbance has changed from a primarily periodic input to a random input due to switches, interlocks, track discontinuities or transitions.

In returning the suspension system for the newer requirements, it is desirable to retain a minimum damping for small and sometimes periodic disturbances. As the magnitude of the random disturbance increases, it is desirable to increase the damping in higher proportions to reduce overshoot of the car body due to the lateral disturbance. In other words, it is desirable to provide light damping except in response to a heavy disturbance, at which time proportionally higher damping is applied as the disturbance becomes greater.

OBJECTS OF THE INVENTION

It is an object of this invention to provide improved lateral damping means between a truck and a railway car body.

It is a further object of this invention to provide an improved lateral damping apparatus between a truck and a car body in which the rate of damping is low for low lateral forces and proportionately higher for higher lateral forces.

BRIEF SUMMARY OF THE INVENTION

In accordance with the present invention, lateral damping apparatus is connected between a truck and a railway car body. The damping apparatus is responsive to provide relatively low damping when low lateral forces are applied thereto and proportionally higher damping as higher lateral forces are applied.

Other objects and advantages of the present invention will be apparent and suggest themselves to those skilled in the art, from a reading of the following specification and claims, taken in conjunction with the accompanying drawings.

DESCRIPTION OF THE DRAWINGS

FIG. 5 is a cross-sectional view of another embodiment of lateral damping means, in accordance with the present invention;

FIG. 6 is a cross-sectional view taken along lines 6—6 of FIG. 5;

FIG. 7 is a cross-sectional view of another embodiment of lateral damping means, in accordance with the present invention; and FIG. 8 is a cross-sectional view taken along lines 8—8 of FIG. 7.

DESCRIPTION OF THE INVENTION

Figure 1:
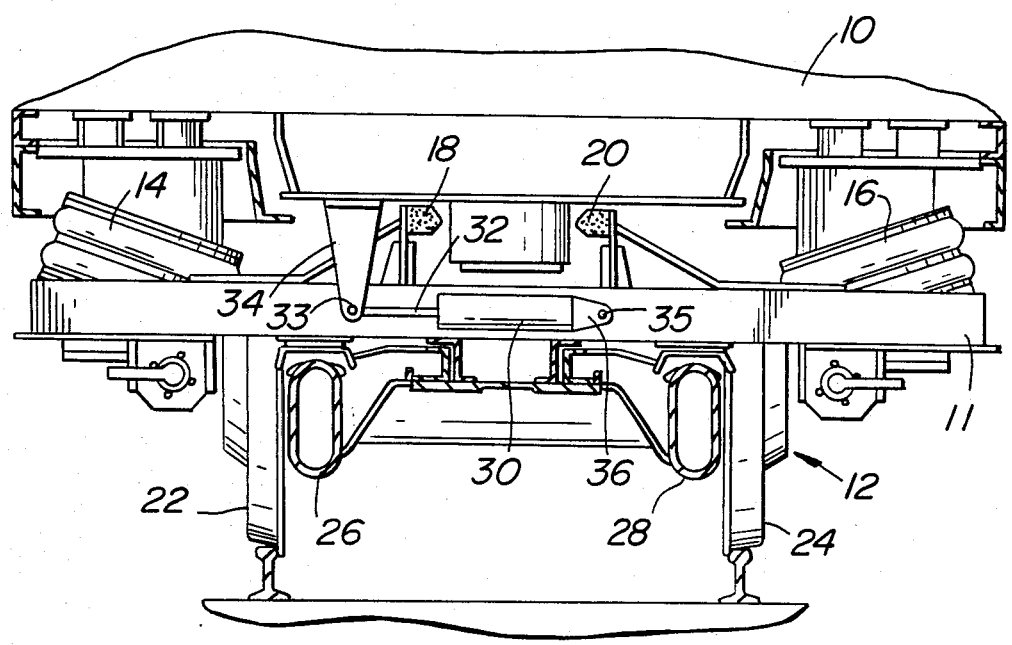
FIG. 1 is an end view, partly in cross-section, illustrating a lateral damping device connected between a truck and a railway car body.

Referring particularly to FIG. 1, a car body 10 is connected to a cross beam or bolster 11 of a truck 12 through conventional apparatus, such as air springs 14 and 16. Lateral stop elements 18 and 20 may be connected to the truck to limit the relative lateral movement between the truck and car body. The truck 12 includes conventional wheel-axle units, including wheels 22 and 24, which are secured to side frames 26 and 28 of the truck 12.

Various other elements associated with the truck and car body are conventional and, because they are not related to the present invention, will not be described in detail.

Damping apparatus 30 comprising a cylindrical member having a movable rod or arm 32 connected thereto is connected between the car body 10 and truck 12. The end of the arm 32 is pivotally connected by a pin 33 to a member 34 which is fixed to the car body 10. The end of the damper 30 opposite the arm 32 includes a connection plate 36 pivotally connected by a pin 35 to the cross beam 11 of the truck 12.

Figure 2:
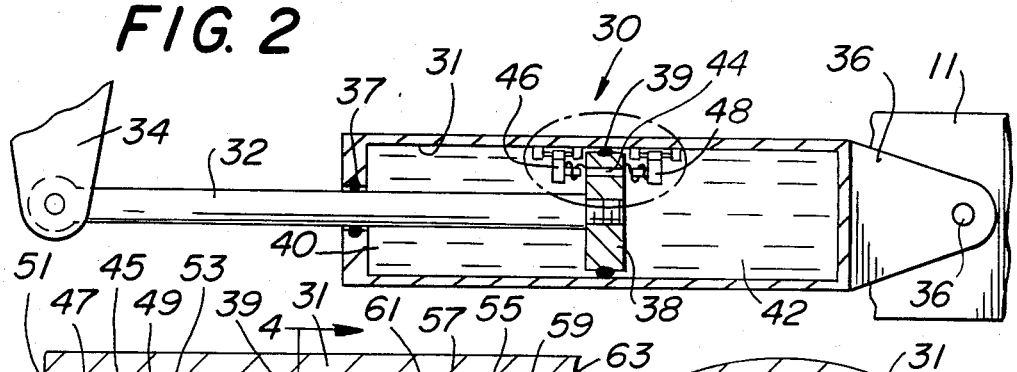
FIG. 2 is a cross-sectional view of the lateral damping device illustrated in FIG. 1.
Figures 3, 4:
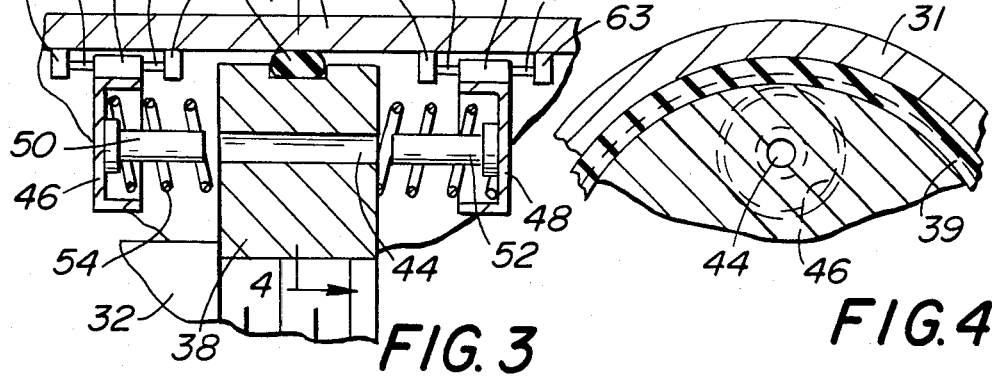
FIG. 3 is an enlarged view of the operating elements of the lateral damping device illustrated in FIGS. 1 and 2.
FIG. 4 is a cross-sectional view taken along lines 4—4 of FIG. 3.

Referring to FIGS. 2, 3 and 4, along with FIG. 1, the damping means 30 comprises the cylindrical housing 31 having the arm 32 extending therethrough, with a suitable liquid seal ring 37 being provided. A piston 38 is connected to the arm 32. The piston 38, along with a liquid seal ring 39, divides the housing into two chambers 40 and 42 for receiving fluid therein, such as oil. The arm 32 moves the piston 38 in accordance with the amplitude and direction of applied lateral forces generated between the car body and truck. For example, lateral forces to the right, as viewed in FIG. 1, causes the arm 32 to drive the piston 38 to the right. Lateral forces to the left causes the arm 32 to pull the piston 38 to the left.

The piston 38 includes an opening 44 therein to permit the fluid in the chambers 40 and 42 to pass back and forth as long as the opening remains unobstructed, as when there is no or very little lateral force present to move the piston 38.

A pair of spring retainer members 46 and 48 are movably mounted to the interior of the cylindrical housing 31 by suitable mechanical elements. The member 46 is secured to a block 45 having shafts 47 and 49 extending therefrom. The shafts are free to move in blocks 51 and 53 secured to the cylinder 31. In like manner, the member 48 is secured to a block 55 connected to shafts 57 and 59. The shafts 57 and 59 ride in blocks 61 and 63 secured to the cylinder 31. The members 46 and 48 include blocker elements 50 and 52, disposed on opposite sides of the opening 44. A pair of compression springs 54 and 56 are disposed around the blocker elements 50 and 52, respectively, with the spring 54 being connected between the spring retainer 46 and piston 38 and the spring 56 being connected between the spring retainer 48 and piston 38.

In the position illustrated in FIGS. 2 and 3, the fluid in the chambers 40 and 42 may pass through the opening 44 with little resistance. This position may be considered as a neutral position with no lateral forces being developed between the car body and truck.

When relatively high lateral forces are applied between the car body and truck, one of the blocker elements 50 or 52, dependent upon the direction of the lateral force, will move into the opening 44 to restrict the flow of fluid flow between the chambers 40 and 42. This results in a high damping action to the lateral forces between the car body and truck.

The embodiment illustrated in FIGS. 2 and 3 tends to provide sudden rise in the amount of damping from a low level to a very high level. In operation, it is sometimes desirable that the rise in damping levels occur gradually at low levels and increase proportionally higher as the magnitude of the applied lateral forces increases.

Referring to FIGS. 5 and 6, damping apparatus 58 illustrates another embodiment of the present invention and may be connected between the car body and truck in the same manner illustrated in FIG. 1. The damping apparatus 58 includes a cylindrical housing 60 having a partition member 62 centrally disposed therein to form two fluid chambers 64 and 66. A movable arm 68 is disposed to be moved within the cylindrical housing 60 in accordance with applied lateral forces in much the same manner as described in connection with the arm 32 in FIG. 2.

The end of the arm 68 extends through an opening 70 within the partition 62 and into a tubular guide member 72 connected between the partition 62 and end wall 74 of the cylindrical housing 60. The tubular guide member 72 includes openings 76 therein to permit fluid to pass freely therethrough.

The end of the arm 68 includes two portions 78 and 80 having diameters larger than the opening 70. A tapered section 82 is integral with the sections 78 and 80 and extends through the opening 70. The tapered section 82 has its smallest diameter towards its center and tapers to larger diameters as it extends towards the sections 78 and 80.

In a neutral condition, as when no lateral forces are developed between the car body and truck, the narrow section 82 is disposed within the opening so that there is little resistance to the flow of fluid between the chambers 64 and 66. When lateral forces are present, the arm 68 will move in one of two directions dependent upon the direction of the applied lateral force. The tapered portion 82 is moved within the opening 70 to provide a greater restriction to the flow of fluid between the chambers thereby providing more lateral damping. Because of the gradually increasing tapers in the section 82, proportionally greater damping is provided as the lateral forces are increased and the arm 38 is moved greater distances.

Referring to FIGS. 7 and 8, another damping apparatus embodying the present invention is illustrated. Again, the damping apparatus 84 may be connected between a car body and a truck in a manner described in connection with FIG. 1. The damping apparatus 84 comprises a cylindrical body 86. A movable arm 88 is connected to a piston 90 which provides two fluid chambers 92 and 94 with the cylindrical body 86. The piston 90 is driven by the arm 88 in accordance with the magnitude and direction of the applied lateral force between the car body and truck.

Fluid flow is provided between the two chambers 92 and 94 by an opening 96. The opening 96 may be divided into three areas including relatively narrow outer areas 98 and 100 and a central relatively large area 102. In a neutral position, fluid is free to pass through the opening 98 and around a weight element 104.

The element 104 comprises a mass capable of acting as an acceleration detector, i.e., it will tend to move in accordance with the forces applied thereto. The element 104 is supported within the area 102 by a pair of springs 110 and 112 and is free to move laterally.

A pair of tapered elements 106 and 108, which may be considered metering rods, are secured to the acceleration responsive member 104 in close proximity to open and close the open portions 98 and 100, dependent upon the magnitude and direction of any applied lateral forces. The springs 110 and 112 are disposed around the tapered elements 106 and 108 to support the member 104 in a neutral position when no lateral forces are applied.

What is claimed is:

1. In combination with a railway truck and attached car body, damping apparatus connected between said truck and car body to provide lateral damping therebetween comprising:
   a. an elongated laterally disposed cylinder having fluid therein;
   b. a piston having an opening disposed within said cylinder to provide two fluid chambers therein;
   c. a piston rod extending through one end of said cylinder;
   d. attachment members for connecting on end of said piston rod to the piston and the respective opposite ends of said cylinder and piston rod laterally between said truck and said car body, and e. actuating means including blocker elements disposed on opposite sides of said opening responsive to lateral forces between said truck and car body to partially block and change the size of said opening in said piston to provide variable damping rates inverse to the magnitudes of said lateral force.

2. A combination as set forth in claim 1 wherein said actuating means further comprises a spring biased weight element disposed adjacent said opening, said biased weight element being responsive to the lateral forces to restrict said opening inversely in accordance with said lateral forces.

3. A combination as set forth in claim 1 wherein said actuating means comprises a rod extending through the opening of said piston, with a portion of said rod within said opening to vary the resistance to fluid flow between said chamber to thereby vary the magnitude of damping.

* * * * *